(No Model.) 2 Sheets—Sheet 2.
C. T. CRATON.
PLOW.
No. 586,545. Patented July 20, 1897.
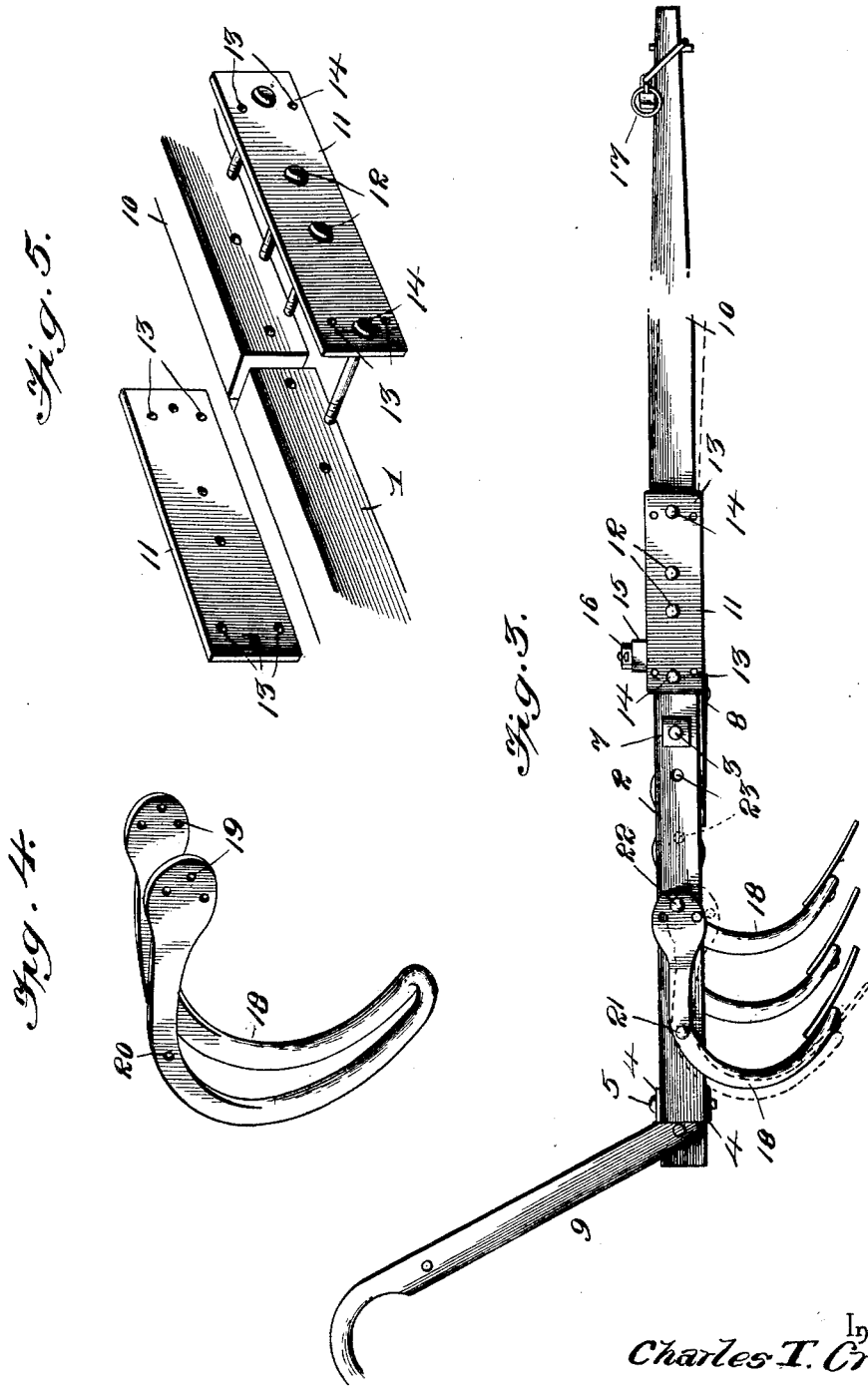
Witnesses
W. J. Koerth
V. B. Hillyard
Inventor
Charles T. Craton,
By his Attorneys,
C. A. Snow & Co.

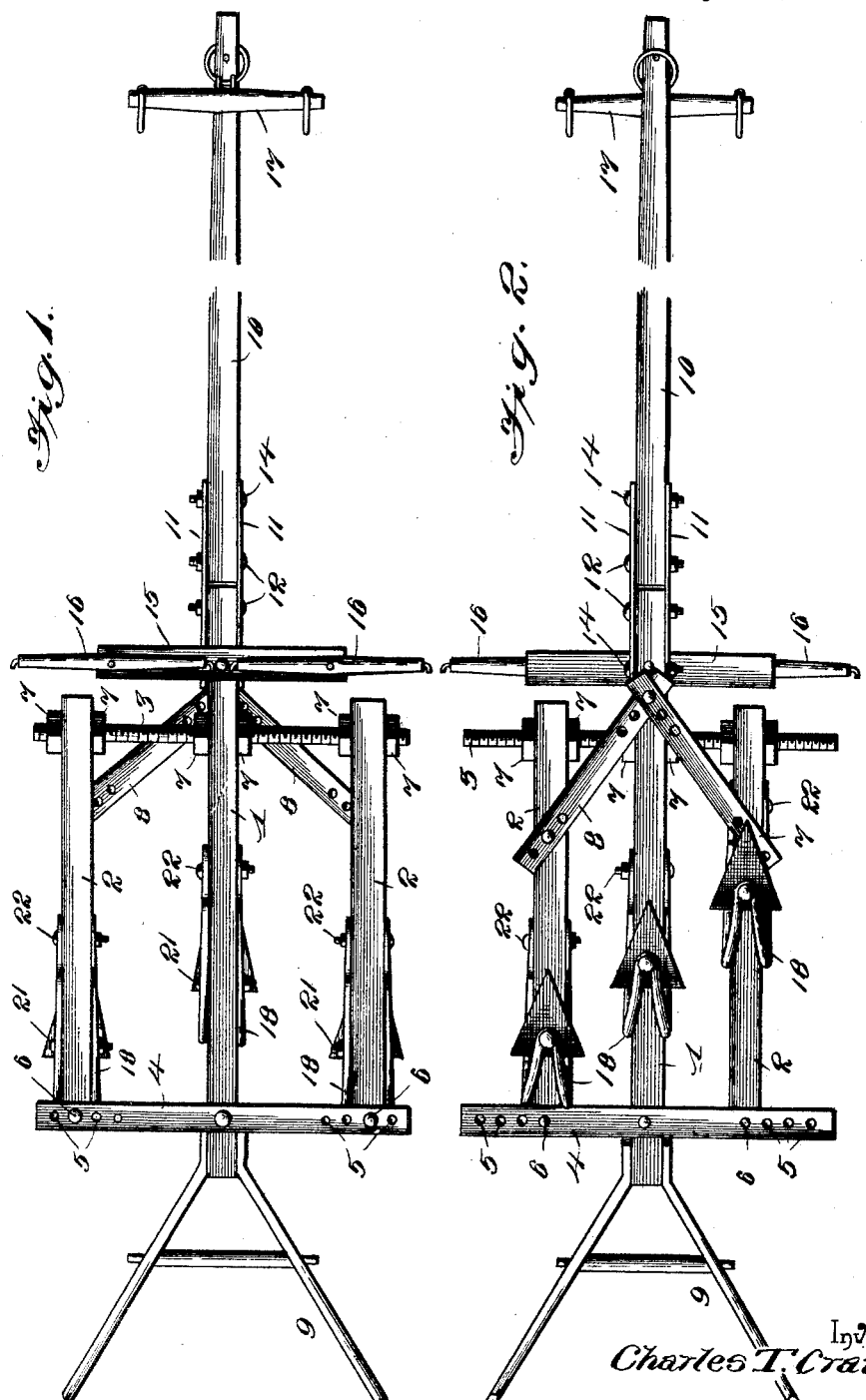

UNITED STATES PATENT OFFICE.

CHARLES T. CRATON, OF BYRD, GEORGIA.

PLOW.

SPECIFICATION forming part of Letters Patent No. 586,545, dated July 20, 1897.

Application filed April 30, 1896. Serial No. 589,693. (No model.)

*To all whom it may concern:*

Be it known that I, CHARLES T. CRATON, a citizen of the United States, residing at Byrd, in the county of Floyd and State of Georgia, have invented a new and useful Plow, of which the following is a specification.

This invention aims to provide an improved plow or agricultural implement for tilling all kinds of land which will be of comparatively light draft, run steady, can be adjusted to run deep or shallow or plow close or wide, can be altered by shifting the position of the shovels or plows for laying off rows, listing, bedding, rebedding, breaking land, or cultivating, and which will save time and labor and be capable of all uses for which a plow or cultivator of the type to which the present invention belongs is designed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a plow constructed in accordance with the principles of this invention. Fig. 2 is a view of the implement inverted and showing the side beams and shovels differently related. Fig. 3 is a side elevation showing the tongue and a shovel adjusted by the dotted lines. Fig. 4 is a detail view of a plow or shovel standard. Fig. 5 is a detail view of the joint formed between the parts of the tongue, the parts being disassociated and grouped together.

Corresponding and like parts are referred to in the following description and indicated in the several views of the accompanying drawings by the same reference-characters.

The frame of the implement comprises a middle longitudinal bar 1, side bars 2, extending about parallel with the middle bar, a rod 3, threaded throughout its length and connecting the three bars at their front ends, and parallel plates 4, connecting the frame-bars at their rear ends. The parallel plates 4 are placed the one above, the other below, the longitudinal bars and have a series of openings 5 formed in their end portions in vertical alinement and which are adapted to receive pins 6, by means of which the rear ends of the side bars have adjustable connection with the parallel plates, whereby the said ends can be moved toward or away from the middle longitudinal bar, according to the desired width of the plow or cultivator.

The rod 3 passes laterally through corresponding openings in the longitudinal or frame bars, and a pair of nuts 7 are provided for each longitudinal bar to secure the latter in an adjusted position, one nut of each pair being placed upon each side of a frame-bar, so that upon loosening one nut and tightening the other the required adjustment can be attained. By a proper adjustment of the middle pair of nuts the front ends of the side bars can be moved laterally, thereby changing the pitch of the plow points or shovels, whereby the width and turn of the furrows are regulated. The side bars are capable of independent adjustment toward and from the middle bar and either end can be moved laterally as required to meet certain conditions as found most advantageous. Braces 8 incline outwardly and rearwardly and adjustably connect the front ends of the side bars with the front end of the middle longitudinal bar, and these braces have a series of openings at each end to receive the fastenings by means of which they are adjustably connected with the respective frame-bars. The handles 9 are secured to the middle bar 1 in the usual way and are provided for directing the movement of the implement as the latter is drawn over the field.

The pole or tongue 10 is secured or coupled to the front end of the middle bar 1 and forms in effect a continuation thereof. The connection or joint between the pole and the frame-bar is such as to admit of the front end of the pole being raised or lowered to cause the plow points or shovels to operate shallow or deep, as desired. As shown, the joint is formed by coupling-plates 11, placed upon opposite sides of the pole and frame-bar and having pivotal connection intermediate of their ends with the pole and frame-bar by means of bolts or pins 12, which pass through coincident openings in the parts. The extremities of the coupling-plates have a series of openings 13, which extend in vertical relation and are adapted to receive pins or bolts 14, by means of which adjustable connection is secured between the said plates and the parts connected thereby.

It will be observed that the pole may be turned upon either or both pivot bolts or pins 12 to secure a desired adjustment, and when positioned it is secured by placing both pins or bolts 14 in place.

The usual doubletree 15, having singletrees 16, is applied to the front end of the frame-bar 1, and the team is hitched thereto in the usual manner. A neck-yoke 17 is applied to the outer end of the pole to cause the animals to work together when the implement is in service.

The plow-standards 18 are similarly formed, and each comprises parallel members formed by doubling a rod or bar upon itself midway of its ends, the terminal portions being expanded and provided with a series of openings 19 to receive a pin or bolt, by means of which the front end of the standard is adjustably connected with a frame-bar. These standards curve throughout their length and their members are spaced apart a distance corresponding to the width or thickness of a frame-bar, so as to receive the latter between the said members. Openings 20 are provided in the members of each plow-standard in transverse alinement and receive a pin or bolt 21, by means of which connection is had between the standard and the frame-bar. A pin or bolt 22 adjustably connects the front end of each standard with its bar, and when removed the standard can be turned upon its pivot 21 to cause the plow point or shovel to dip more or less, and after the required adjustment is had the position of the standard is fixed by replacing the pin or bolt 22, previously removed. The frame-bars have a series of openings 23 to admit of the relative position of the standards being changed so that the plow or cultivator can be adapted for any required work, either for listing, bedding, cultivating, &c.

The standards may be adjusted so as to aline transversely, or the side standards may be in transverse alinement and the middle standard set forward or in the rear of a line connecting the side standards, or either side standard may be placed to the front or the rear, as required to attain a definite result.

The various adjustments of the frame-bars and standards adapt the implement for any condition of land or character of work, and the shifting and moving of the parts can be effected in a comparatively short time, and the implement will be rigid and capable of performing the work in a satisfactory manner in any adjusted position of the parts.

Having thus described the invention, what is claimed as new is—

In an agricultural implement, the combination of a bar, plates placed upon opposite sides of the bar and projecting forward thereof, and having pivotal connection with the bar about midway of their ends, and having a vertical series of corresponding openings at their front and rear ends, and adapted to tilt about their pivotal connection with the bar, a pin passing through an opening in the bar and through registering openings of the plates to hold the latter in an adjusted position, a pole placed between the projecting ends of the plates and having pivotal connection therewith about midway of their ends, and a pin passing through an opening of the pole and corresponding openings at the front ends of the plates to hold the pole in an adjusted position, substantially as specified.

In testimony that I claim the foregoing as my own I have hereto affixed my signature in the presence of two witnesses.

CHAS. T. CRATON.

Witnesses:
   H. G. STOFFREGEN,
   L. A. TODD.